UNITED STATES PATENT OFFICE.

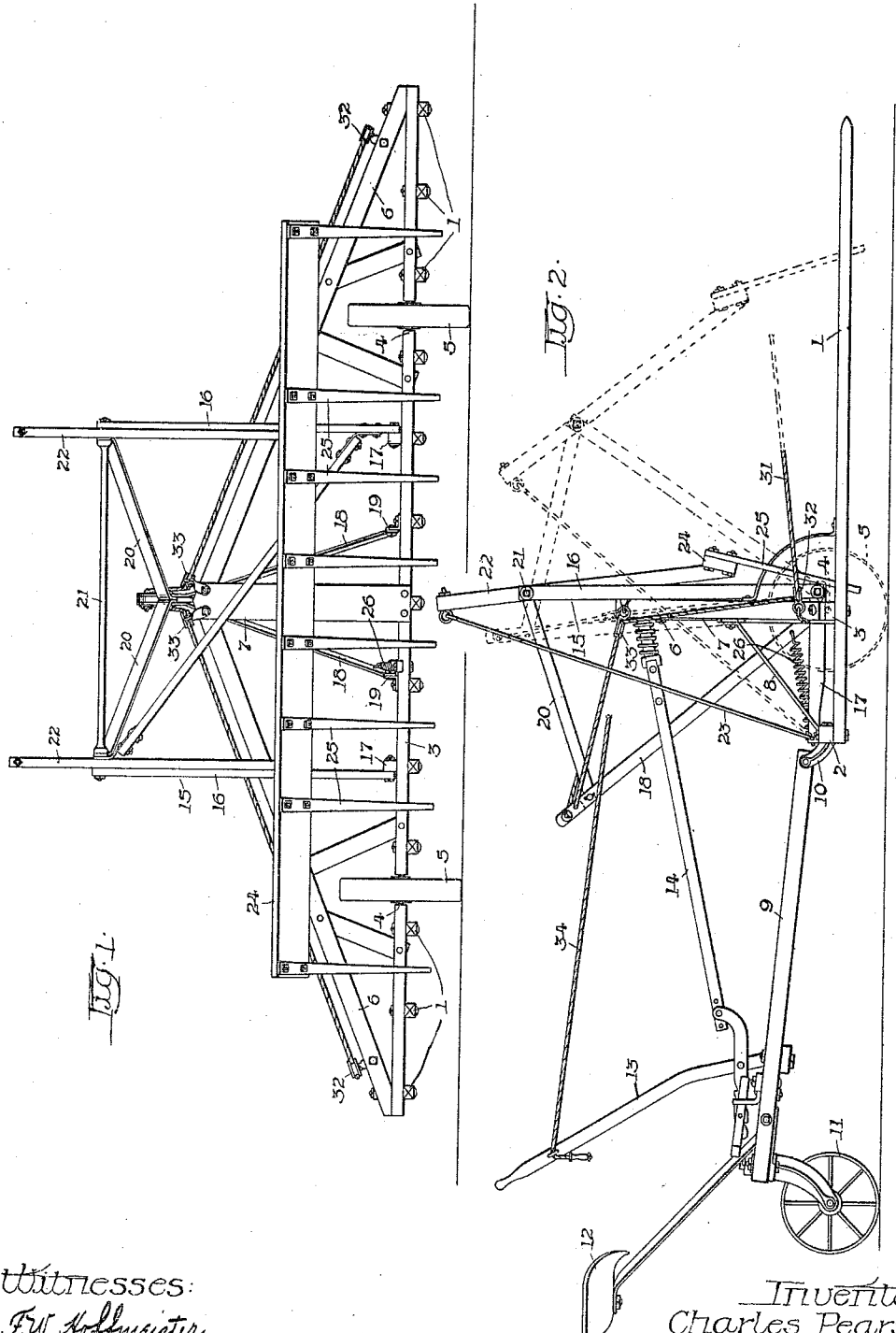

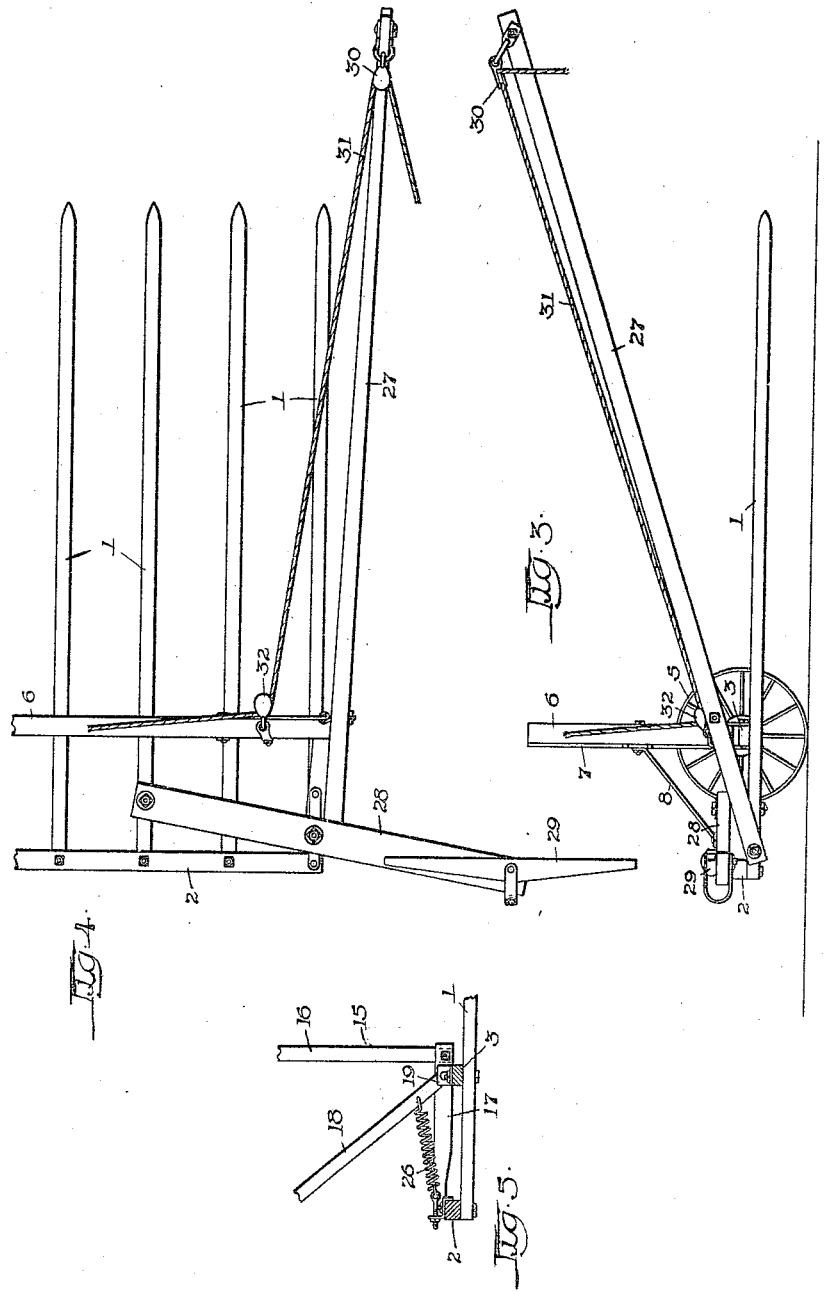

CHARLES PEARSON, OF CHICAGO, ILLINOIS, ASSIGNOR TO INTERNATIONAL HARVESTER COMPANY, A CORPORATION OF NEW JERSEY.

HAY-RAKE.

959,796.  Specification of Letters Patent.  Patented May 31, 1910.

Application filed November 26, 1909. Serial No. 529,869.

*To all whom it may concern:*

Be it known that I, CHARLES PEARSON, a citizen of the United States, residing at Chicago, in the county of Cook and State of Illinois, have invented certain new and useful Improvements in Hay-Rakes, of which the following is a specification.

My invention relates to that type of rakes commonly called sweep rakes, usually used in connection with a stacker mechanism, the rake being adapted to deposit the load upon a fork forming part of the stacker; the object of my invention being to provide means whereby the load may be delivered from the rake to the stacker in a positive manner.

I attain this object by means of the mechanism illustrated by the accompanying drawings, in which—

Figure 1 is a front end elevation of a rake having my invention forming a part thereof; Fig. 2 is a side elevation of Fig. 1; Fig. 3 is a side elevation of part of the rake mechanism and designed to show the manner of connecting the load releasing means with the draft pole; Fig. 4 is a top plan view of Fig. 3; and Fig. 5 is a detached detail of part of the load releasing mechanism.

The same reference numerals designate like parts throughout the several views.

1 represents the rake teeth having their rear ends secured to the transverse bar 2, and 3 represents a transverse bar secured to the teeth forward of the bar 2 and provided, intermediate its ends, with axle members 4, upon which are journaled carrying wheels 5.

6 represents upwardly and inwardly inclined truss members having their outer ends secured to bar 3.

7 represents a strut member connecting the upper ends of the truss members 6 with the transverse member 3, and 8 represents brace members connecting the truss members with the rear transverse bar.

9 represents a trailing frame pivotally connected at its forward end to brackets 10 secured to transverse bar 2, the trailing frame being supported at its rear end by means of a caster wheel 11.

12 represents a seat mounted upon the frame, and 13 a hand lever pivotally connected with the trailing frame and connected with the rake frame by means of a common form of rake controlling mechanism, including a bar 14, having its forward end slidably connected with the strut member 7.

For the purpose of assisting to discharge a load carried by the rake, I have mounted a swinging frame 15 on the rake in a manner to swing in a longitudinal direction relative to the rake teeth, the frame including vertically arranged bars 16, having their lower ends pivotally connected with bars 17 secured to the transverse bars 2 and 3, and 18 represents rearwardly, upwardly and inwardly inclined bars having their lower ends pivotally connected with clips 19 secured to bar 3, and their upper ends pivotally connected with bar 16 by means of members 20.

21 represents a stay rod connection between the forward ends of members 20 and the vertical bars 16. Received between the members 20 and 16, and free to turn upon the stay rod are levers 22, having their upper ends flexibly connected with the rear part of the rake frame by means of links 23, and 24 represents a head piece secured to the lower ends of the levers, having teeth 25 secured thereto and projecting downward below the plane of the rake teeth.

26 represents a tension spring having one end connected with a fixed part of the rake frame, and the opposite end with one of the members 18 in a manner to yieldingly hold the swinging frame 15 in substantially a vertical position, with the head piece 24 in the position shown in full lines in Fig. 2.

The pivotal connection of the swinging frame 15 with the rake frame, and the levers 22 being mounted intermediate their ends upon the swinging frame, which gives them a moving fulcrum, and having their upper ends connected with the rake frame in rear of the pivots of the swinging frame causes the discharge head to move substantially parallel with the rake teeth when the swinging frame is rocked about its pivots in a manner to discharge the load.

27 represents draft poles having their rear ends pivotally connected with the rake in a manner to have a limited upward and downward movement at their forward ends, and 28 represents draft bars having their inner ends secured to the rake frame and provided with swingletrees 29 at their opposite ends. Mounted upon the forward end of the draft poles are sheave members 30, and 31 represents ropes passing around the sheaves, having one end adapted to be connected with a part of the equipment of the draft animals, and its opposite end passing around sheaves 32 secured to opposite sides of the rake frame, and then around sheaves 33 secured to the inner ends of the truss frame members, and then connected with the upper ends of members 18 in a manner to cause a forward movement of the load discharging mechanism from the position shown in full lines to that shown in dotted lines in Fig. 2, when the draft animals are backed up to withdraw the rake teeth from beneath the load.

The load discharging mechanism may be manually operated by passing a rope 34 from one of the centrally arranged sheaves upon the truss frame rearward within reach of the operator, who, by pulling upon the rope, will cause the swinging frame to move forward.

What I claim as my invention, and desire to secure by Letters Patent, is:

1. In a hay rake, the combination of a rake frame, rake teeth secured to said frame, a load discharging mechanism including a swinging frame having its lower end pivotally connected with said rake frame and adapted to swing in a longitudinal direction relative to said rake teeth, levers pivotally connected intermediate their ends to the upper end of said swinging frame, a load discharging head secured to the lower ends of said levers, said levers having their upper ends connected with said rake frame in a manner to cause said discharging head to move substantially parallel with said rake teeth when said swinging frame is rocked about its pivotal connection with the rake frame.

2. In a hay rake, the combination of a rake frame, rake teeth secured to said frame, a load discharging mechanism including a swinging frame having its lower end pivotally connected with said rake frame and adapted to swing in a longitudinal direction relative to said rake teeth, levers pivotally connected intermediate their ends to the upper end of said swinging frame, a load discharging head secured to the lower ends of said levers, and a link connection between the upper ends of said levers and said rake frame in rear of the pivotal connection of said swinging frame therewith.

3. In a hay rake, the combination of a rake frame, rake teeth secured to said frame, a load discharging mechanism including a plurality of vertically arranged levers mounted intermediate their ends upon a movable fulcrum and adapted to rock in a longitudinal direction relative to said rake teeth, a load discharging head secured to the lower ends of said levers, the upper ends of said levers being connected with said rake frame, and means for moving the fulcrum on which they are mounted.

4. In a hay rake, the combination of a rake frame, rake teeth secured to said frame, a load discharging mechanism including a swinging frame having its lower end pivotally connected with said rake frame and adapted to swing in a longitudinal direction relative to said rake teeth, levers pivotally connected intermediate their ends to the upper end of said swinging frame, a load discharging head secured to the lower ends of said levers, a link connection between the upper ends of said levers and said rake frame, draft poles secured to said rake frame, and means coöperating with the backward movement of the draft animals to cause said swinging frame to rock about its pivotal connection with said rake frame.

5. In a hay rake, the combination of a rake frame, rake teeth secured to said frame, draft poles secured to opposite sides of said rake frame, a load discharging mechanism including a swinging frame adapted to move in a longitudinal direction relative to said rake teeth, said frame including vertically arranged bars having their lower ends pivotally connected with the rake frame, a stay rod connection between the upper ends of said bars, supplemental bars extending rearward, upward and inward, having their lower ends pivotally connected with the rake frame and their upper ends connected with said vertically arranged bars, levers mounted upon said stay rod intermediate their ends, a load discharging head secured to the lower ends of said levers, a link connection between their upper ends and the rake frame, and means for rocking said swinging frame about its pivots.

6. In a hay rake, the combination of a rake frame, rake teeth secured to said frame, draft poles secured to opposite sides of said rake frame, a load discharging mechanism including a swinging frame adapted to move in a longitudinal direction relative to said rake teeth, said frame including vertically arranged bars having their lower ends pivotally connected with the rake frame, a stay rod connection between the upper ends of said bars, a supplemental frame extending rearward and upward relative to said swinging frame, having its lower end pivotally connected with said rake frame and its upper end with said swinging frame, levers mounted intermediate their ends upon said stay rod, a load discharging head secured to the lower ends of said levers, a link connection between the upper ends of said levers and the rake frame, means for rocking said swinging and supplemental frames in a forward direction, and a spring connection between the swinging frame and rake frame operative to yieldingly oppose the forward movement of said swinging frame.

CHARLES PEARSON.

Witnesses:
FRANK O. ZABILKA,
RAY PATTISON.